United States Patent [19]

Parkell et al.

[11] Patent Number: 4,500,334
[45] Date of Patent: Feb. 19, 1985

[54] GLASS STREAM CUTTING APPARATUS

[75] Inventors: Edward Parkell, Millville; Mark C. Newkirk, Vineland, both of N.J.

[73] Assignee: Maul Technology Corporation, Millville, N.J.

[21] Appl. No.: 519,446

[22] Filed: Aug. 2, 1983

[51] Int. Cl.³ .................................. C03B 5/38
[52] U.S. Cl. .......................... 65/334; 83/600; 83/613
[58] Field of Search .............. 65/133, 332, 334; 83/600, 613

[56] References Cited

U.S. PATENT DOCUMENTS

| 3,592,938 | 7/1971 | Bracken et al. | 65/334 |
| 3,996,037 | 12/1976 | Wythe | 65/334 |
| 4,174,647 | 11/1979 | Dahms | 65/334 X |
| 4,214,494 | 7/1980 | Dahms | 65/334 X |
| 4,214,497 | 7/1980 | Dahms | 65/334 X |

Primary Examiner—Robert Lindsay
Attorney, Agent, or Firm—Seidel, Gonda & Goldhammer

[57] ABSTRACT

A quadruple gob glass feeder and cooperating shear mechanism are disclosed. The shear mechanism has two arms reciprocal toward and away from each other. Each arm has four blades arranged in mating pairs to cooperate with each other for cutting four streams of glass.

13 Claims, 3 Drawing Figures

4,500,334

GLASS STREAM CUTTING APPARATUS

BACKGROUND OF THE INVENTION

Apparatus for cutting a plurality of glass streams into gobs is known to those skilled in the art. For example, see U.S. Pat. No. 3,592,938 which discloses a triple gob stream cutting apparatus. The apparatus disclosed in said patent includes a pair of arms reciprocal toward and away from each other and coupled together by a rack and pinions. The apparatus in said patent when in the shearing position, orientates the blades so that their cutting edges form the apices of a triangle.

The apparatus disclosed in said patent is operated by a motor operated cam at a remote location which through rods and lever arms reciprocates the blades toward and away from one another. We have found that there is a a need to make the shear mechanism self contained while having quadruple sets of blades for simultaneously shearing four glass streams into gobs.

SUMMARY OF THE INVENTION

The present invention is directed to apparatus for simultaneously shearing a plurality of glass streams into gobs. First and second arms are supported at one end by a discrete carriage for reciprocation in a horizontal direction. An electric motor is coupled to the carriages for simultaneously reciprocating the free ends of the arms toward and away from each other. Each arm has a plurality of blades adapted to mate with a blade on the other arm.

The apparatus preferably includes a pneumatic spring for biasing the arms to an open position wherein the arms are remote from each other and for facilitating the locking of the arms in the open position. The apparatus preferably includes quadruple sets of blades on the arms and arranged so as to be overlapped with their cutting edges in a row when in the shearing position.

Various objects and advantages of the present invention will appear hereinafter.

DETAILED DESCRIPTION

Figure 1:
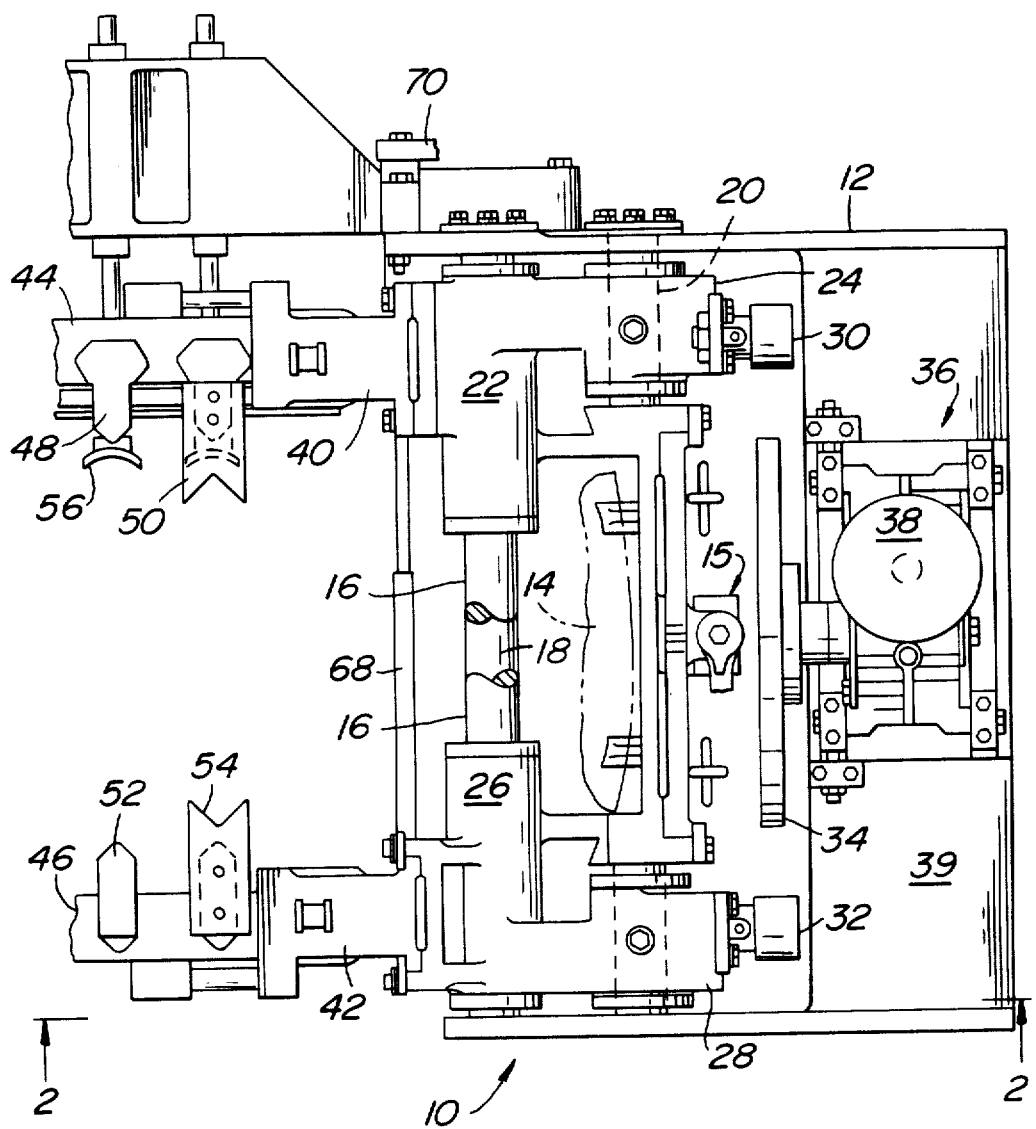
FIG. 1 is a top plan view of a shear mechanism in accordance with the present invention.

Referring to the drawing in detail, wherein like numerals indicate like elements, there is shown a shear mechanism in accordance with the present invention and designated generally as 10. The shear mechanism includes a frame 12 coupled to the spout casing 14 of a feeder by way of a adjustable mechanism 15 for adjusting the height of the shear mechanism 10 relative to the orifices of the feeder.

Figure 2:
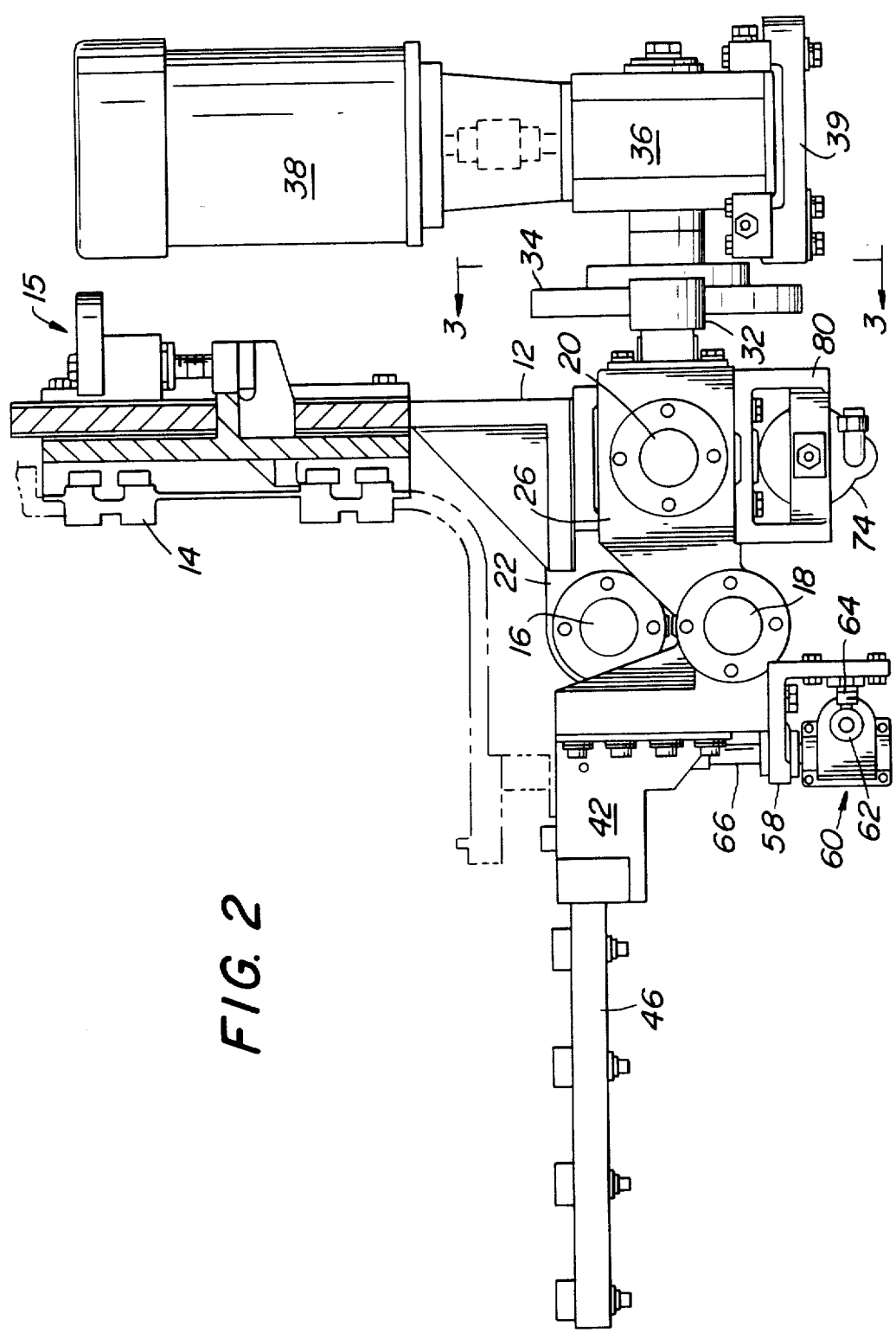
FIG. 2 is a side elevation view of the shear mechanism shown in FIG. 1 adjustably attached to a spout casing.

The frame 12 supports a plurality of parallel shafts designated 16, 18 and 20. As shown more clearly in FIG. 2, shafts 16 and 18 are disposed one above the other. A carriage 22 is reciprocal along shaft 16 and has an extension 24 which is guided by the shaft 20. A second carriage 26 is similarly reciprocal along shaft 18 and has an extension 28 guided by shaft 20. Thus, each carriage is guided by two different shafts but there are only a total of three shafts whose axes form a triangle.

A cam follower 30 is attached to the extension 24. See FIG. 1. A cam follower 32 is attached to extension 28. The carriages 22 and 26 are illustrated in FIG. 1 in a locked-open position. When in use, the cam followers 30 and 32 are spring biased into contact with the periphery of a cam 34. Cam 34 rotates about an axis perpendicular to the axes of shafts 16, 18 and 20. Cam 34 is connected to the output from a variable speed gear mechanism 36 to which is connected the output shaft of a high speed electric motor 38 such as a synchronous motor having three horsepower and a speed of 1725 rpm. Mechanism 36 and motor 38 are supported by frame portion 39. The carriages 22 and 26 reciprocate toward and away from each other due to the contact between cam followers 30, 32 and the cam 34. The carriages make two reciprocations per revolution of the cam 34 due to the shape of cam 34.

Carriage 22 has an arm 40 extending in a direction away from the extension 24. Carriage 26 has a similar arm 42. Arm 40 has a shank holder 44. Arm 42 has a shank holder 46. Shanks 48, preferably four in number are, attached to holder 44. Shanks 52, preferably four in number, are attached to holder 46. A blade 50 is removably attached to each shank 48 and a mating blade 54 is attached to each shank 52. The blades 50, 54 are adapted for overlaping contact as illustrated and described in patent 3,592,938. When the blades are in an overlapping shearing position, they are adapted to cut four glass streams aligned in a row as they discharge from the orifice ring of the feeder. Shank holder 40 preferably supports a drop guide 56 associated with each blade.

A mechanical means is provided for adjusting the tension between mating blades at their zone of overlap. As shown more clearly in FIG. 2, a bracket 58 is attached to carriage 26 and supports an adjusting mechanism 60. Mechanism 60 includes helical gears in a gear box. One of the gears is attached to shaft 68 and the other is attached to shaft 66. Shaft 66 is attached to the arm 42 and is adapted to move arm 42 up and down with respect to its carriage 26. The shaft 68 supports one of the gears and has an external spur gear 62 cooperating with a latch 64. The last mentioned gear and spur gear 62 are mounted on shaft 68 which extends across the frame as shown more clearly in FIG. 1 and terminates at a rachet operated arm 70.

Figure 3:
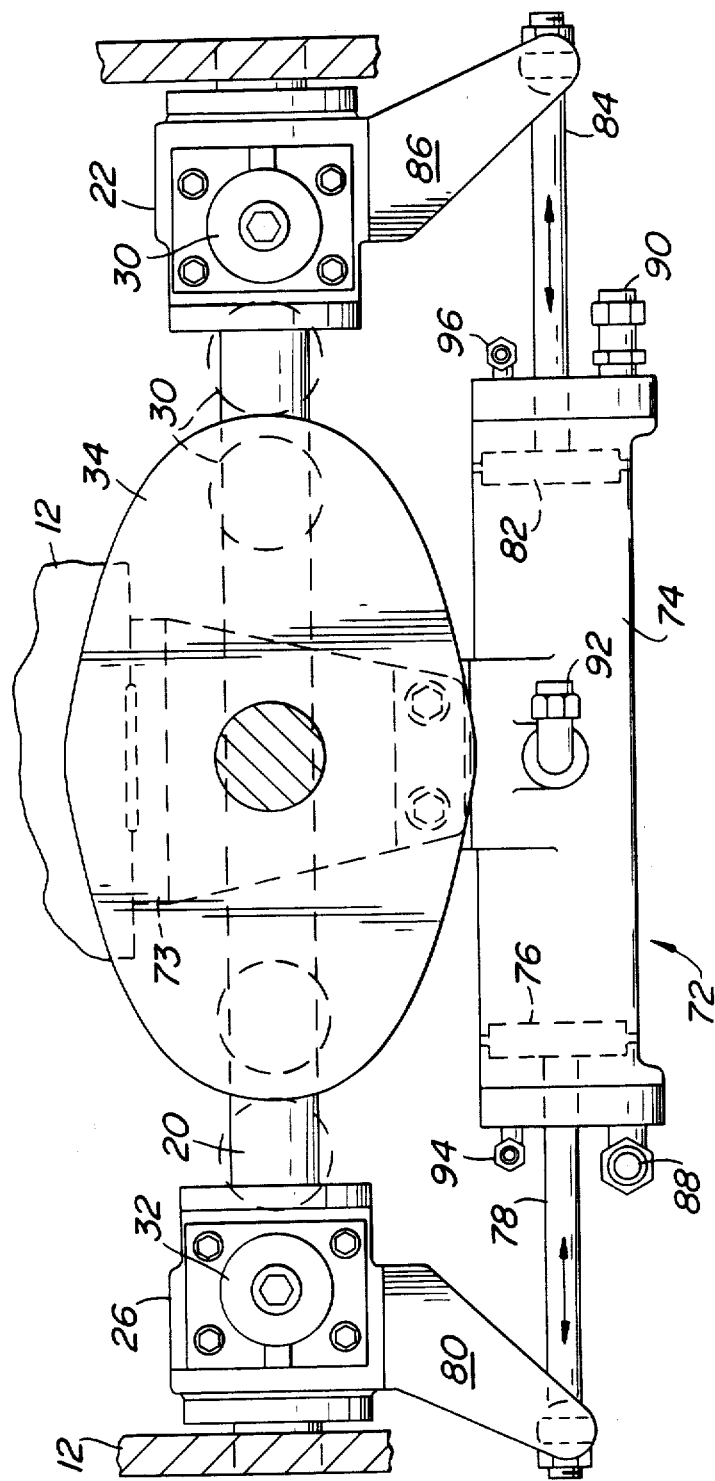
FIG. 3 is a sectional view taken along the line 3—3 in FIG. 2 but on an enlarged scale.

A pneumatic spring designated generally as 72 is shown more clearly in FIG. 3. The pneumatic spring is supported from the frame 12 by bracket 73 and is adapted to maintain the cam followers 30, 32 in contact with the periphery of cam 34 in addition to being able to lock out the arms in their open position as shown in FIGS. 1 and 3.

The pneumatic spring 72 includes a pneumatic cylinder 74. Within cylinder 74 there is provided a piston 76 connected to one end of piston rod 78. The other end of piston rod 78 is pivotably connected to a bracket 80. Bracket 80 depends from the carriage 26.

Within the cylinder 74 there is also provided a piston 82 connected to one end of a piston rod 84. The other end of rod 84 is pivotably connected to a bracket 86. Bracket 86 depends from the carriage 22. A supply and exhaust line 88 is connected to one end of the cylinder 74. A supply and exhaust line 90 is connected to the other end of cylinder 74. A third supply and exhaust line 92 is connected to a central portion of the cylinder 74. In the position of the pistons 76, 82 as shown in FIG. 3, cylinder 74 is pressurized by way of line 92 while lines 88 and 90 are exhausted. Vents 94 and 96 for lubricating bushings are provided on opposite ends of the cylinder 74. When line 92 is exhausted, and cylinder 74 is pressurized by way of lines 88 and 90, the cam followers 30, 32 are biased into contact with the periphery of cam 34. Phantom positions for cam follower 30 are shown in FIG. 3.

The operation of the apparatus of the present invention will be readily apparent to those skilled in the art in view of the above description in the attached drawings. The desired elevation of the shear mechanism 10 is adjusted relative to the spout casing of the feeder by way of mechanism 15. Arm 40 is fixed to its carriage 22. Arm 42 is vertically adjustable with respect to its carriage 26 so as to attain the proper blade tension by way of mechanism 60. When the line 92 is exhausted and lines 88, 92 are pressurized, the cam followers 30, 32 are in contact with the cam 34. Cam 34 is driven by motor 38 through gear box 36. As cam 34 rotates through one revolution, the arms 40, 42 and their associated blades move toward and away from each other twice. Each time the blades 50, 54 overlap one another, a gob is sheared from each of the four glass streams discharging from the orifice ring. The gobs are conveyed by a distribution device not shown to a I.S. machine which simultaneously converts the four gobs into four glass containers.

The present invention may be embodied in other specific forms without departing from the spirit of essential attributes thereof and, accordingly, reference should be made to the appended claims, rather than to the foregoing specification, as indicating the scope of the invention.

I claim:

1. Apparatus for simultaneously cutting a plurality of glass streams into gobs comprising first and second arms supported at one end by a discrete carriage for reciprocation in a horizontal direction, a cam, a cam follower associated with each carriage, an electric motor coupled to said carriages by way of said cam for simultaneously reciprocating the free ends of said arms toward and away from each other, each arm supporting a plurality of blades adapted to mate with blades on the other arm, and a pneumatic spring biasing said arms towards each other and biasing said cam followers into contact with said cam, said pneumatic spring being adapted to lock said arms in an open position.

2. Apparatus in accordance with claim 1 wherein each arm supports four blades, and one of said arms being vertically adjustable relative to its carriage for adjusting blade tension.

3. Apparatus in accordance with claim 1 wherein said electric motor is a synchronous motor supported by said frame and coupled to said cam by way of a gear box.

4. Apparatus in accordance with claim 1 wherein said carriages are guided by three shafts whose axes form a triangle, the shaft whose axis forms an apex of the triangle guiding each of said carriages.

5. Apparatus for simultaneously cutting four aligned glass streams into gobs comprising a frame, first and second arms supported at one end by a discrete carriage mounted for reciprocation in a horizontal direction by said frame, each arm having four blades adapted to mate with a blade on the other arm, a cam follower on each carriage, a cam supported by said frame, spring means biasing each cam follower into contact with said cam, an electric motor supported by said frame and coupled to rotate said cam.

6. Apparatus in accordance with claim 5 wherein said motor is a synchronous electric motor coupled to said cam by way of a gear box.

7. Apparatus in accordance with claim 6 wherein said spring means is a pneumatic spring.

8. Apparatus in accordance with claim 7 wherein said pneumatic spring includes a cylinder containing two pistons, each piston being connected to a discrete carriage, means for pressurizing each end of the cylinder so that the pistons move toward each other and for pressurizing the space between the pistons so that the pistons move away from each other.

9. Apparatus for simultaneously cutting a plurality of glass streams into gobs comprising first and second arms supported at one end by a discrete carriage for reciprocation in a straight line in a horizontal direction, a frame supporting said carriages, a cam supported by said frame, a cam follower associated with each carriage, a synchronous electric motor supported by said frame and coupled to said cam by way of a gear box for simultaneous reciprocating the free ends of said arms toward and away from each other, each arm supporting a plurality of blades adapted to mate with blades on the other arm, and spring means biasing each cam follower into contact with said cam.

10. Apparatus in accordance with claim 9 wherein said spring means is a pneumatic spring.

11. Apparatus in accordance with claim 10 wherein said spring means includes a cylinder containing two discrete pistons, each piston being connected to a discrete carriage, means for pressurizing each end of the cylinder so that the pistons may move towards each other and for pressurizing the space between the pistons so that the pistons may move away from each other.

12. Apparatus in accordance with claim 9 wherein each arm is a cantilever supported at one end by its associated carriage.

13. Apparatus in accordance with claim 9 wherein said cam is arranged to reciprocate each carriage twice per cam revolution.

* * * * *